United States Patent
Hawkes et al.

(10) Patent No.: US 6,950,517 B2
(45) Date of Patent: Sep. 27, 2005

(54) EFFICIENT ENCRYPTION AND AUTHENTICATION FOR DATA PROCESSING SYSTEMS

(75) Inventors: Philip Michael Hawkes, Burwood (AU); Gregory G. Rose, Concord (AU)

(73) Assignee: Qualcomm, Inc., San Diego, CA (US)

( * ) Notice: Subject to any disclaimer, the term of this patent is extended or adjusted under 35 U.S.C. 154(b) by 172 days.

(21) Appl. No.: 10/205,132

(22) Filed: Jul. 24, 2002

(65) Prior Publication Data

US 2004/0017913 A1 Jan. 29, 2004

(51) Int. Cl.⁷ .................................................. H04L 9/00
(52) U.S. Cl. ........................... 380/37; 380/28; 380/30; 380/42; 380/43; 380/277; 713/150; 713/151; 713/168; 713/171
(58) Field of Search .............................. 380/28, 30, 37, 380/42, 43, 277; 713/150, 151, 168, 171

(56) References Cited

U.S. PATENT DOCUMENTS

| | | | | |
|---|---|---|---|---|
| 4,918,728 A | * | 4/1990 | Matyas et al. ............... | 380/280 |
| 2001/0046292 A1 | * | 11/2001 | Gligor et al. ................. | 380/37 |
| 2002/0071552 A1 | * | 6/2002 | Rogaway ...................... | 380/37 |

OTHER PUBLICATIONS

P. Rogaway et al., OCB: A Block–Cipher Mode of Operation for Efficient Authenticated Encryption, Department of Computer Science, University of California at Davis, california, USA, Aug. 3, 2001.*

V. Gligor et al., On Message Integrity in Symetric Encryption, Nov. 10, 2000, VDG Inc., Chevy Chase Maryland, Nov. 10, 2000.*

C. Jutla. Encryption Modes with almost free message integrity,. Advances in Cryptology–EUROCRYPT 2001. Lecture Notes in Computer Science, vol. 2045, B. Pfitzmann, ed., Springer–Verlag, 2001.*

* cited by examiner

*Primary Examiner*—Ayaz Sheikh
*Assistant Examiner*—Taghi T. Arani
(74) *Attorney, Agent, or Firm*—Phil Wadsworth; Sandip S. (Micky) Minhas; Jae-Hee Choi

(57) ABSTRACT

Methods and apparatus are presented herein for encrypting and authentication data, such that some of data can be transmitted in the clear but still be authenticated by the sender. A set of cleartext positions and/or a set of ciphertext positions are used to specify which data blocks will be used to generate an input checksum value and an output checksum value. These checksums are then used to generate an authentication tag.

22 Claims, 8 Drawing Sheets

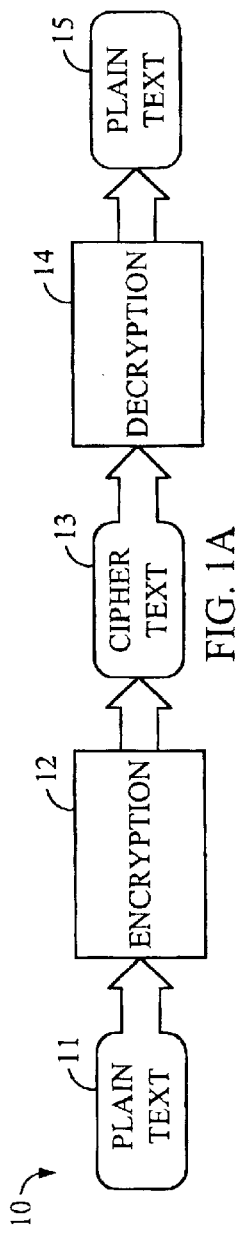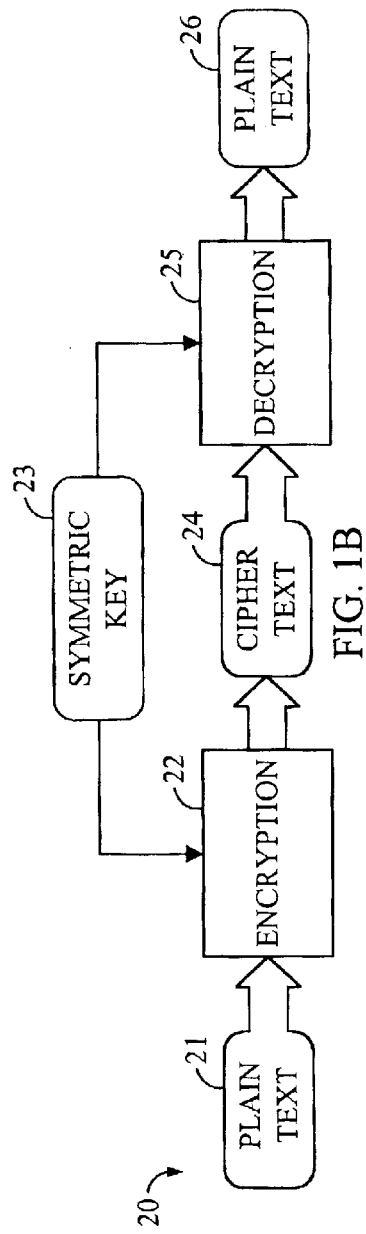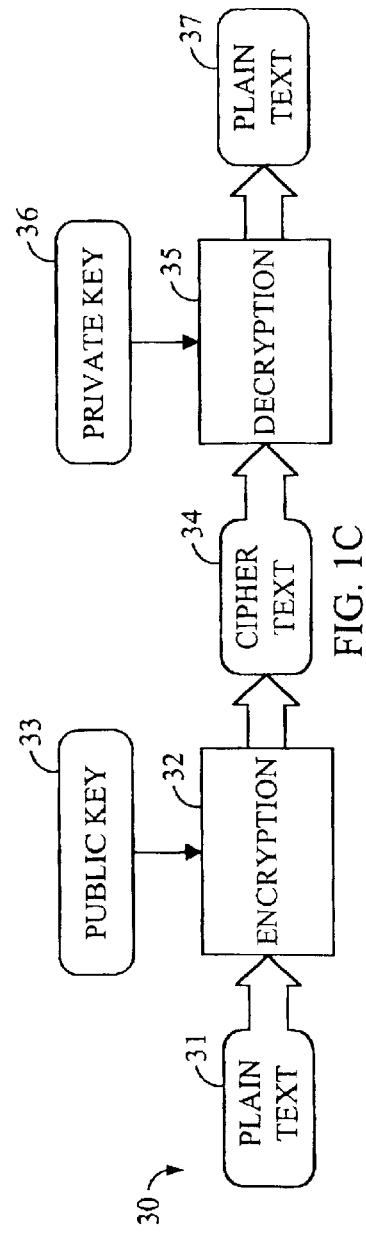

EFFICIENT ENCRYPTION AND AUTHENTICATION FOR DATA PROCESSING SYSTEMS

CROSS REFERENCE

This application is related to application Ser. No. 10/205,430 filed Jul. 24, 2002, entitled "Fast Encryption and Authentication for Data Processing Systems"; application Ser. No. 10/205,133 filed Jul. 24, 2002, entitled "Fast Encryption and Authentication for Data Processing Systems"; and application Ser. No. 10/205,114 filed Jul. 24, 2002, entitled "Efficient Encryption and Authentication for Data Processing Systems."

BACKGROUND

1. Field

The present invention relates to the field of data processing systems. In particular, to improving security in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems and information systems utilized in these fields. Cryptographic methods that provide such security are usually categorized according to two purposes: encryption and authentication. Encryption is the art of rendering data unreadable by unauthorized parties. Authentication is the art of verifying the integrity of the data. Verifying the integrity of the data involves verifying the author identity of the data and/or verifying whether the data has been altered.

Encryption systems are often referred to as cryptosystems, and have the property of being either symmetric or asymmetric. A symmetric encryption system uses a secret key to encrypt information and the same secret key to decrypt the encrypted information. An asymmetric encryption system, such as a public key cryptosystem, uses a first key to encrypt information and uses a different key to decrypt the encrypted information.

In many symmetric cryptosystems, one key is used for the encryption function and a separate key is used for the authentication function. Hence, in data processing systems using a symmetric cryptosystem, encryption and authentication are performed as two separate entities. Since authentication requires approximately as much processing power as encryption, the total amount of processing is equivalent to the amount of processing required to encrypt the data twice. In data processing systems that operate in a power-limited or hardware-limited environment, such as, e.g., a cellular telephone, personal digital assistant, or other portable communication device, it would be desirable to have a cryptosystem that can perform encryption and authentication as a single entity in order to reduce the computational load upon the device or to increase the speed at which the device performs the encryption and authentication.

In the paper, "Encryption Modes with Almost Free Message Integrity," written by Charanjit Jutla, *Advances in Cryptology*, EUROCRYPT 2001, Lecture notes in Computer Science, vol. 2045, Springer-Verlag, 2001, cryptosystems were presented that can encrypt messages and authenticate the encrypted messages in a manner that requires little more processing than encryption alone. In other words, encryption and authentication can be performed efficiently as a single functional entity. Hence, the amount of processing resources required to provide security is reduced.

The Jutla cryptosystems are designed to encrypt all of the data that is to be transmitted. However, the requirement that all data of a message must be encrypted is undesirable in certain applications. For example, in communication protocols such as IPSec, encryption of all data is not efficient. A header portion of the data must be sent unencrypted for addressing purposes. The foundations of IPSec are specified in RFC 1825 entitled "Security Architecture for the Internet Protocol," RFC 1826 entitled "IP Authentication Header," and RFC 1827 entitled "IP Encapsulating Security Payload (ESP)," all of which were submitted by R. Atkinson in August 1995.

Hence, there is a present need for a secure and efficient system for encryption and authentication of data wherein all data bits of a message need not be encrypted.

SUMMARY

Methods and apparatus are presented herein to address the need stated above. Specifically, methods and apparatus are presented for allowing some portion of the data message to be transmitted as plaintext, some portion of the data message to be transmitted as ciphertext, and using a single authentication tag for verifying both the plaintext portion and the ciphertext portion of the data message.

In one aspect, a method is presented for encrypting and authenticating data as a single entity, the method comprising: arranging data into a plurality of plaintext blocks, each sized according to a cipher block size; specifying at least one cleartext position for which at least one ciphertext block will be the same as a corresponding plaintext block; determining a plurality of noise blocks using a nonce value and a first key; determining a plurality of intermediate ciphertext blocks, wherein the first intermediate ciphertext block corresponds to an encrypted nonce value, and the remaining intermediate ciphertexts are computed iteratively by encrypting a plurality of intermediate plaintext blocks with a second key, wherein each intermediate plaintext block is a combination of one of the plurality of plaintext blocks and a preceding intermediate ciphertext block; determining a plurality of ciphertext blocks by using the plurality of intermediate ciphertext blocks and the plurality of noise blocks, wherein the first ciphertext block is the same as the first intermediate ciphertext block and the remaining ciphertext blocks are derived by combining a corresponding intermediate ciphertext block with a corresponding noise block; computing an input checksum value based on the plurality of plaintext blocks and the intermediate ciphertext block corresponding to the last plaintext block; computing an output checksum value based on the plurality of ciphertext blocks and a noise block; computing an authentication tag by encrypting the input checksum value with the second key and combining the encrypted input checksum value with the output checksum; substituting each of the plurality of ciphertext blocks that is specified by a cleartext position with a corresponding plaintext block; and appending the authentication tag.

In another aspect, a method is presented for decrypting and verifying a plurality of data blocks accompanied by an authentication tag, wherein a set of cleartext positions is defined, the method comprising: using a nonce value and a first key to determine a plurality of noise blocks; combining each of the plurality of data blocks that is not specified by a cleartext position in the set of cleartext positions with a corresponding noise block in order to determine a plurality of intermediate ciphertext blocks; designating each of the plurality of data blocks that is specified by a cleartext position in the set of cleartext positions as a plaintext block in a plurality of plaintext blocks; for each cleartext position in the set of cleartext positions, combining the corresponding plaintext block with a previous intermediate ciphertext block to form an intermediate plaintext block and encrypting the intermediate plaintext block to form an intermediate ciphertext block corresponding to the cleartext position; for each position not in the set of cleartext positions, decrypting the corresponding intermediate ciphertext block to form an associated intermediate plaintext block and combining the associated intermediate plaintext block with a previous intermediate ciphertext block to form a plaintext block for each position not in the set of cleartext positions; determining a plurality of secondary ciphertext blocks, wherein each of the plurality of secondary ciphertext blocks correspond to a cleartext position in the set of cleartext positions and are formed by combining a corresponding intermediate ciphertext block with a corresponding noise block; computing an input checksum value by combining the last intermediate ciphertext block and the plurality of data blocks that is not specified by a cleartext position in the set of cleartext positions; computing an output checksum value by combining a noise block and the plurality of secondary ciphertext blocks; and verifying the authentication tag.

In another aspect, a method is presented for secure data transmissions, wherein a first portion of the data transmission is sent as plaintext, a second portion of the data transmission is sent as ciphertext, and all of the data transmission is authenticated, the method comprising: generating a set of cleartext positions; encrypting the first portion of the data transmission and the second portion of the data transmission into ciphertext, wherein the first portion of the data transmission is specified by the set of cleartext positions and the second portion of the data transmission is not associated with any one of the set of cleartext positions; generating an input checksum value using the data transmission that is not associated with any one of the set of cleartext positions; generating an output checksum value using the ciphertext of the first portion of the data transmission; generating an authentication tag using the input checksum value and the output checksum value; and transmitting the plaintext, the ciphertext, and the authentication tag, wherein the plaintext is the first portion of the data transmission specified by the set of cleartext positions.

In another aspect, a method is presented for decrypting and verifying a plurality of received transmission blocks, the method comprising: determining whether each of the plurality of received transmission blocks is specified by a cleartext position from a set of cleartext positions; decrypting the plurality of received transmission blocks, the decrypting comprising: if not specified by a cleartext position, then generating a set of intermediate ciphertext blocks, decrypting the set of intermediate ciphertext blocks to generate a set of intermediate plaintext blocks, and generating a set of plaintext blocks; if specified by a cleartext position, then combining each of the plurality of received transmission blocks specified by a cleartext position with a previous intermediate ciphertext block to form an intermediate plaintext block, and encrypting the intermediate plaintext block to obtain an intermediate ciphertext block; and verifying the plurality of received transmission blocks, the verifying comprising: forming an input checksum value using the set of plaintext blocks not specified by a cleartext position; forming an output checksum value using a set of secondary ciphertext blocks, wherein the secondary ciphertext blocks are derived from a set of intermediate ciphertext blocks not associated with a cleartext position; and using the input checksum value and the output checksum value for comparison to the authentication tag.

In another aspect, apparatus is presented for secure data transmissions, wherein a first portion of the data transmission is sent as plaintext, a second portion of the data transmission is sent as ciphertext, and all of the data transmission is authenticated, the method comprising: means for generating a set of cleartext positions; means for encrypting the first portion of the data transmission and the second portion of the data transmission into ciphertext, wherein the first portion of the data transmission is specified by the set of cleartext positions and the second portion of the data transmission is not associated with any one of the set of cleartext positions; means for generating an input checksum value using the data transmission that is not associated with any one of the set of cleartext positions; means for generating an output checksum value using the ciphertext of the first portion of the data transmission; means for generating an authentication tag using the input checksum value and the output checksum value; and means for transmitting the plaintext, the ciphertext, and the authentication tag, wherein the plaintext is the first portion of the data transmission specified by the set of cleartext positions.

In another aspect, apparatus is presented for decrypting and verifying a plurality of received transmission blocks, the apparatus comprising: means for determining whether each of the plurality of received transmission blocks is specified by a cleartext position from a set of cleartext positions; means for decrypting the plurality of received transmission blocks, the decrypting comprising: if not specified by a cleartext position, then generating a set of intermediate ciphertext blocks, decrypting the set of intermediate ciphertext blocks to generate a set of intermediate plaintext blocks, and generating a set of plaintext blocks; if specified by a cleartext position, then combining each of the plurality of received transmission blocks specified by a cleartext position with a previous intermediate ciphertext block to form an intermediate plaintext block, and encrypting the intermediate plaintext block to obtain an intermediate ciphertext block; and means for verifying the plurality of received transmission blocks by forming an input checksum value using the set of plaintext blocks not specified by a cleartext position, forming an output checksum value using a set of secondary ciphertext blocks, wherein the secondary ciphertext blocks are derived from a set of intermediate ciphertext blocks not associated with a cleartext position, and using the input checksum value and the output checksum value for comparison to the authentication tag.

BRIEF DESCRIPTION OF THE DRAWINGS

FIGS. 1A, 1B, and 1C, are block diagrams of a basic cryptosystem, a symmetric encryption system, and an asymmetric encryption system, respectively.

DETAILED DESCRIPTION

Figure 2A:
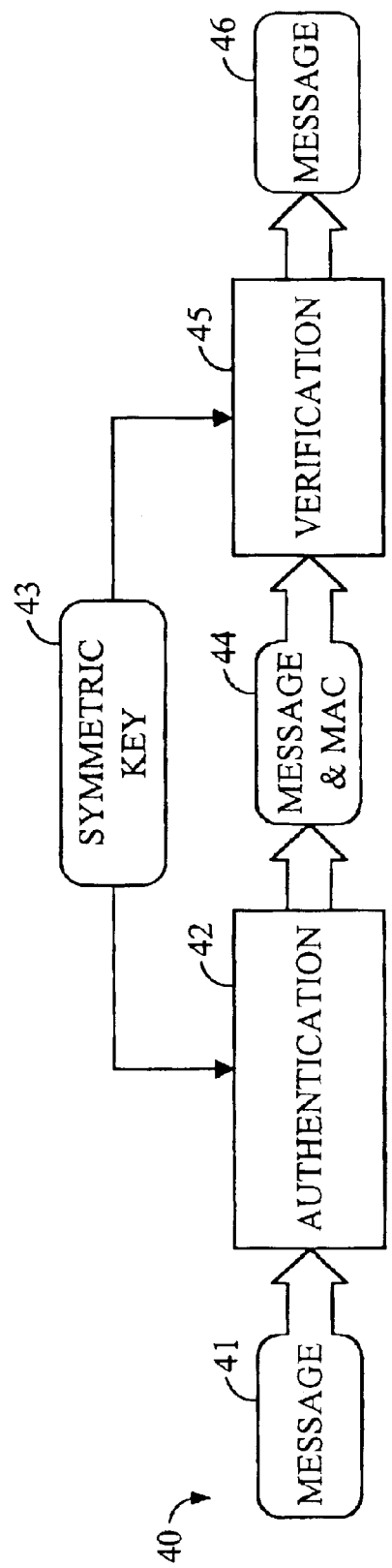
FIGS. 2A and 2B are block diagrams of a symmetric authentication system and an asymmetric authentication system, respectively.
Figure 2B:
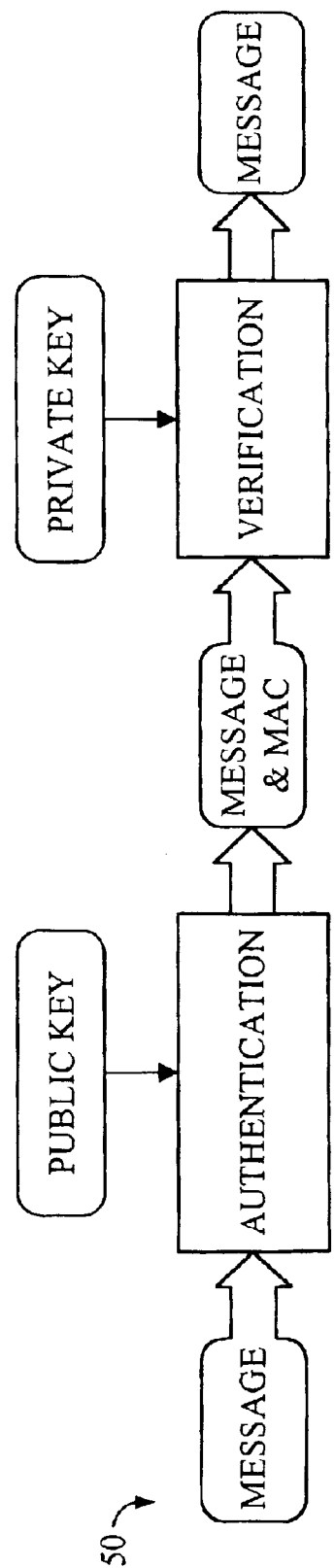

Encryption renders data unreadable by unauthorized parties. The original data message is referred to as a plaintext message or plaintext. The encrypted message is called a ciphertext, wherein encryption includes any means to convert plaintext into ciphertext, e.g., block ciphers, hash functions, or any other cryptographic function. Decryption includes any means to convert ciphertext into plaintext, i.e., to recover the original message. FIG. 1A illustrates a basic cryptosystem 10 designed for encryption. The plaintext message 11 is operated upon by an encryption scheme 12 to form ciphertext 13. The ciphertext 13 is then transmitted through a communication channel (not shown) and undergoes a decryption scheme 14 at another site (not shown) to recover the plaintext 15. Plaintext and ciphertext can refer to any data, including audio and video data presented in digital form.

Cryptanalysis is the art of circumventing the security of cryptosystems. The entity performing the cryptanalysis is known in the art as an adversary or attacker. A cryptanalysis of an encryption scheme is directed towards decrypting an unauthorized message. A cryptanalysis of an authentication scheme is directed towards the composition of a message that can be verified as being sent by someone else.

A cryptosystem is based on secrets. A group of entities shares a secret if an entity outside this group cannot obtain the secret without expending a significantly large amount of resources. This secret is said to serve as a security association within the group of entities.

Typically, the secret comprises a key or a set of keys, which are measured in bits. The longer the key, the more cryptically secure the key will be. A symmetric cryptosystem uses the same secret key to encrypt a message as to decrypt a message. A symmetric encryption system 20 is illustrated in FIG. 1B, wherein both the encryption and decryption utilize a same private key. Plaintext 21 is operated upon by an encryption scheme 22. A secret key 23 is used in the encryption scheme 22 to form ciphertext 24. Cipher text 24 is transmitted over a communication channel (not shown) to another site wherein a decryption scheme 25 uses the same secret key 23 to form the plaintext 26.

In contrast, an asymmetric cryptosystem uses a first key to encrypt a message and uses a different key to decrypt it. FIG. 1C illustrates an asymmetric encryption system known as a public key cryptosystem 30, wherein a public key is provided for encryption and a private key is provided for decryption. The public key is published, so that any party can use the public key to encrypt any message. However, only the privately held, unpublished key may be used to decrypt the message encrypted with the public key. Plaintext 31 is input into an encryption scheme 32, which uses a public key 33 that is associated with a designated party and obtained from a publication. The resulting ciphertext 34 is transmitted over a communication channel (not shown) to the designated party. The designated party uses a private key 36 in a decryption scheme 35 to convert the ciphertext 34 into plaintext 37.

Symmetric encryption is generally much faster than asymmetric encryption. However, transfer of the secret key from a sender to a recipient is problematic due to the possibility of interception by an adversary. One solution is to use a trusted third party to hold the keys, who will share a key only with an authorized party. The embodiments described herein do not address this problem, and assumes that the sender and receiver share a secret key.

The integrity of the ciphertext generated by the above cryptosystems is typically provided by appending some authenticating data to the transmitted ciphertext. The authenticating data is usually computed as a function of the message content and a secret integrity key.

In a symmetric authentication system, the authenticating data is known as a Message Authentication Code (MAC). The MAC is computed as a function of both the message content and a secret integrity key, wherein both the sender and the designated target share the secret integrity key. The sender transmits the message and appends the MAC. The message can be either plaintext or ciphertext. The receiver re-computes the MAC from the message and accepts the integrity of the message only if the re-computed MAC agrees with the transmitted MAC. Theoretically, only the sender of the message could generate a valid signature for that message, thereby authenticating the message for the receiver.

A symmetric authentication system 40 is illustrated in FIG. 2A, wherein both the signing and verification utilize a same private key. The message 41 is operated upon by an authentication scheme 42 that uses a key 43 to form authenticating data 44. The authenticating data 44 and the message 41 are then transmitted through a communication channel (not shown) to another party (not shown). The message 41 is operated upon a verification scheme 45 using a same key 43 to determine authenticating data 46. The authenticating data 46 that is generated by the receiving party is compared to the authenticating data 44 that is received over the communication channel.

In an asymmetric authentication system, the authenticating data is known as a digital signature. The digital signature is computed as a function of the message content and a private integrity key of the sender. The sender transmits the digital signature to a receiving party, who then performs a verification upon the digital signature using a public key of the sender. An asymmetric authentication system 50 is illustrated in FIG. 1E, wherein the signing utilizes a private key and the verification utilizes the corresponding public key.

In some schemes, the MAC or digital signature is computed from a 'message digest' that contains a unique mathematical description of a secret message. The message digest is smaller in length than the original message, so that computations upon the message digest are more easily performed. Dependence of the MAC or digital signature upon a secret message or upon a message digest ensures that the authenticating data does not remain constant, since the secret message or message digest does not remain constant. If the authenticating data does remain constant across multiple messages, then an adversary could easily appropriate the authenticating data falsely.

The message digest is often computed using a cryptographic hash function. A cryptographic hash function computes a value (comprising a fixed number of bits) from any input, regardless of the length of the input. One property of a cryptographic hash function is that given an output value, it is computationally difficult to determine an input that will result in that output. An example of a cryptographic hash function is SHA-1, as described in "Secure Hash Standard,"

FIPS PUB 180-1, promulgated by the Federal Information Processing Standards Publications (FIPS PUBS) and issued by the National Institute of Standards and Technology (NIST).

A block cipher is a symmetric encryption scheme for which the input to the scheme is always a fixed length in bits. The length is known as the block size of the block cipher. An example of a block cipher is the Data Encryption Standard (DES) as described in "Data Encryption Standard", FIPS PUB 46-1 promulgated by the FIPS PUBS and issued by the NIST. DES has a block size of 64-bits. Another example of a block cipher is the Advanced Encryption Standard (AES) as described in "Advanced Encryption Standard", FIPS PUB 197 promulgated by the FIPS PUBS and issued by the NIST. AES has a block size of 128-bits.

The key length of a block cipher is the length of the key in bits. However, the entropy of a key is the logarithm (base 2) of the number of possible values for the key. The entropy is also written in terms of bits. For example, the DES has a 64-bit key, with 8 of these bits used as checksums to detect errors in key transmission. Consequently, the key-entropy of DES is (64−8)=56 bits.

Given several pairs of inputs and corresponding outputs of a block cipher, the block cipher key can be derived by an adversary who tests all possible key values in order to determine which inputs result in the correct outputs. This type of attack is known as an exhaustive key search. The computational complexity of this attack is the number of encryption operations required for the attack. Hence, an attack for extracting a k-bit key requires approximately $2^k$ encryption operations to extract the block cipher key in an exhaustive key search.

Block ciphers are useful for constructing other cryptographic entities. The way in which a block cipher is used is called a mode of operation. Four modes of operation for DES have been standardized and are described in "DES Modes of Operation", FIPS PUB 81, promulgated by the FIPS PUBS and issued by the NIST. These four modes are Electronic Codebook (EBC), Cipher Bock Chaining (CBC), Output Feedback (OFB) and Cipher Feedback (CFB). For illustrative purposes, only ECB and CBC are discussed herein to encrypt a sequence of plaintext blocks $P_1, \ldots,$ and $P_m$.

In ECB mode, the block cipher is used to encrypt each block of plaintext into a block of ciphertext according to the following relation:

$$C_i = E_K(P_i),$$

where $E_K(P_i)$ denotes the encryption of the block $P_i$ using the key K. When used herein, $D_K(P_i)$ denotes the decryption of block $P_i$ using the key K.

In CBC mode, the first plaintext block is XORed with a secret initial value (IV) to form a result that is then encrypted. A mathematical description of this process is written in accordance with the relation:

$$C_1 = E_K(P_1 \oplus IV).$$

Thereafter, each plaintext block is XORed with the previous ciphertext prior to encryption as follows:

$$C_i = E_K(P_i \oplus C_{i-1}).$$

Efficient encryption and authentication can be problematic in symmetric cryptosystems. Until recently, the only solution to satisfy this requirement was to use a naïve approach: provide encryption and authentication as two separate functions. The two functions require approximately equal amounts of computation, so using both functions is twice as expensive as using only one or the other.

Figure 3:
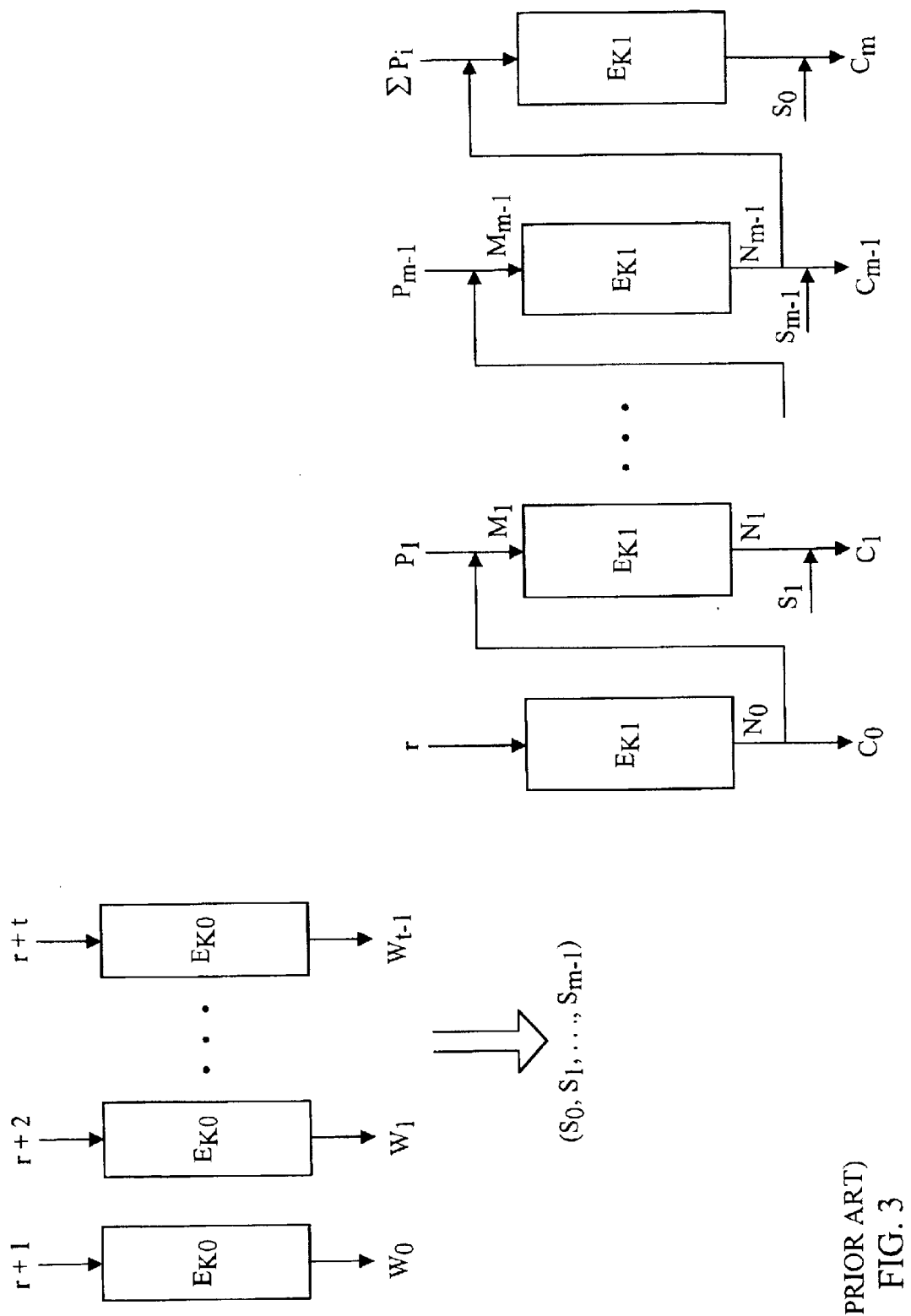
FIG. 3 is a block diagram of the Integrity Aware Cipher-Block Chaining Mode.

In the paper, "Encryption Modes with Almost Free Message Integrity," Jutla proposed two methods that provide encryption and authentication requiring only slightly more computations than either encryption or authentication alone. These methods are of a general form and employ a block cipher as a cryptographic kernel. In the cryptographic community, such a method is also called a "mode of operation." One of Jutla's mode of operations, known as Integrity Aware Parallelizable mode (IAPM) mode, is not discussed in this document. The other of Jutla's mode of operations, known as Integrity Aware Cipher-Block Chaining (IACBC) mode, is shown in FIG. 3. IACBC uses two keys: $K_0$ and $K_1$. Suppose a sender wishes to encrypt and authenticate a message consisting of (m−1) message blocks $P_1$ through to $P_{m-1}$. The sender sets t equal to the next integer greater than the logarithm (base two) of (m+1). The sender chooses a random value r (known as a nonce or initial value) that is encrypted to form ciphertext block $C_0$. The values of r+1 through to r+t are encrypted to form values $W_0$ through to $W_{t-1}$, wherein the encryption uses the key $K_0$. The values $W_0$ through to $W_{t-1}$ are then used to derive pair-wise independent values $S_0$ through to $S_m$. These values are referred to herein as noise blocks. The values $S_0, \ldots, S_m$ are pair-wise independent if $S_0, \ldots, S_m$ are uniformly distributed n-bit random numbers with the property that for every pair $S_i$ and $S_j$, where $i \neq j$, and every pair of n bit constants $c_1$ and $c_2$, the probability that $S_i = c_1$ and $S_j = c_2$ is $2^{-2n}$. The actual computation of $S_0$ through to $S_m$ is not relevant to the understanding of IACBC and will not be described herein. The values of the ciphertext blocks $C_1$ through to $C_{m-1}$ are derived iteratively for $1 \leq i \leq m-1$ according to the relationships:

$$M_i = P_i \oplus N_{i-1},$$

$$N_i = E_{K1}(M_i),$$

$$C_i = N_i \oplus S_i,$$

wherein the key $K_1$ is used for each ciphertext block and the initial value $N_0$ is set to $C_0$. The values $M_i$ are called intermediate plaintext blocks and the values $N_i$ are called intermediate ciphertext blocks. The sender then computes a checksum value $P_m$, which is defined by:

$$P_m = P_1 \oplus P_2 \oplus \ldots \oplus P_{m-1}.$$

A MAC tag $C_m$ is computed from $P_m$ by encrypting $(P_m \oplus N_{i-1})$ with key $K_1$ and XORing the encrypted result with $S_0$. Mathematically, the computation can be represented as follows:

$$C_m = E_{K1}(P_m \oplus N_{i-1}) \oplus S_0.$$

The sender transmits $C_0 \ldots C_m$.

Suppose a receiver receives $C'_0 \ldots C'_m$. The receiver begins the decryption process by first decrypting $C'_0$ to form r', wherein the decryption uses the key $K_1$. The values of r'+1 through to r'+t are encrypted to form values $W'_0$ through to $W'_{t-1}$, wherein the encryption uses the key $K_0$. The receiver then computes the values of $S'_0$ through to $S'_m$. The values of the ciphertext blocks $P_1$ through to $P_{m-1}$ are derived iteratively for $1 \leq i \leq m-1$ according to the relations:

$N'_i=C'_i \oplus S'_i,$ $M'_i=D_{K1}(N'_i),$ $P_i=N'_{i-1} \oplus M'_i,$ wherein the key $K_1$ is used for each plaintext block and the initial value $N'_0$ is set equal to $C'_0$. The receiver then computes a checksum value $P'_m$ defined by:

$P'_m=P'_1 \oplus P'_2 \oplus \ldots \oplus P'_{m-1}.$

A value X is computed by encrypting the XOR of $P'_m$ with $N'_{m-1}$ using key $K_1$, and then XORing the encrypted result with $S'_0$. Mathematically, the process can be described as follows:

$X=E_{K1}(P'_m \oplus N'_{m-1}) \oplus S'_0.$

If X and $C'_m$ are equal, then the receiver can be sure of the integrity of the encrypted message.

Gligor and Donescu, in the paper "Fast Encryption and Authentication: XCBC Encryption and XEBC Authentication Modes," proposed a similar mode called extended Ciphertext Block Chaining mode (XCBC mode) that provides encryption and authentication using a similar amount of computation. The main difference between XCBC and IACBC is in the formulation of the noise blocks $S_0$ through to $S_m$, the formation of which is not relevant to this document.

The IACBC and XCBC modes of operation have certain undesirable properties. The first undesirable property is that these modes require all of the data to be sent encrypted. In Internet protocols such as IPSec, it is not desirable to transmit messages where all the data is encrypted. In particular, headers containing addressing information must be sent in the clear. The embodiments described herein propose a variant of the IACBC and XCBC modes (hereafter referred to as the CBC-IO mode) that allows blocks of the data to be sent as plaintext, while adding only a small amount of processing.

It should be noted that either hardware or software in data or communication systems could be configured to perform the different embodiments of the CBC-IO mode. Hardware may include, but are not limited to, processing elements that implement a set of instructions stored on a computer-readable medium, e.g., memory, to perform the encryption, authentication, decryption, and verification processes that are described herein. Moveover, the various combination steps are described using the bit-wise, logical exclusive-or operator. Other implementations of the embodiments can be performed by using modular integer addition operations, wherein two inputs are treated as binary representations of integers, an intermediate value is formed as the binary representation as the sum of the integers, and the output is formed by truncating the intermediate value to the cipher block size. Other group operators can also be used with the appropriate modifications, however, for the purpose of illustrative ease, only the embodiments using XOR operators are described herein.

Figure 4A:
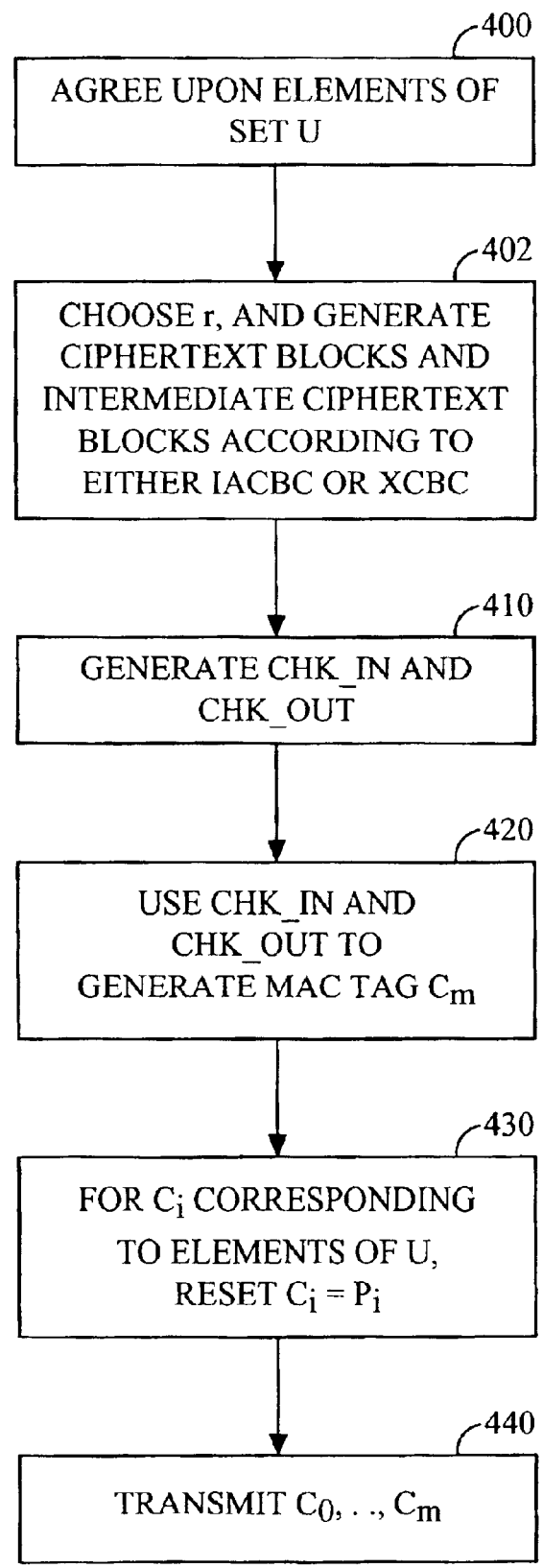
FIG. 4A is a block diagram of the CBC-IO Mode.

An embodiment of the CBC-IO mode is illustrated in FIG. 4A. The CBC-IO mode of operation uses two keys: $K_0$ and $K_1$. Suppose a sender wishes to encrypt and authenticate a message consisting of (m−1) message blocks $P_1$ through to $P_{m-1}$.

At step 400, the sender and receiver agree on the set of plaintext blocks to be sent in unencrypted form. Let U denote the set of indices of the plaintext blocks to be sent in un-encrypted form, wherein the elements of U are referred to as cleartext positions.

At step 402, the sender chooses a nonce value r and follows the IACBC or XCBC mode to compute the noise blocks $S_0$ through to $S_m$, to obtain the intermediate ciphertexts $N_0$ through to $N_{m-1}$, and to obtain the ciphertexts $C_0$ through to $C_{m-1}$. That is, $N_0=C_0=E_{K1}(r)$, and the values of the intermediate ciphertexts $N_0$ through to $N_{m-1}$ and the ciphertext blocks $C_1$ through to $C_{m-1}$ are derived iteratively for $1 \leq i \leq m-1$, according to the relations:

$M_i=P_i \oplus N_{i-1},$ $N_i=E_{K1}(M_i),$ $C_i=N_i \oplus S_i.$

Note that the key $K_1$ is used for each ciphertext block. In an alternative embodiment, the nonce value r can be a predetermined value that is stored both by the sender and receiver, rather than a derived value.

At step 410, the sender computes checksum values CHK_IN and CHK_OUT, which are defined by:

CHK_IN=$(\oplus_{i \notin U} P_i) \oplus N_{m-1}$, and

CHK_OUT=$(\oplus_{i \in U} C_i) \oplus S_0.$

At step 420, the sender computes a MAC tag $C_m$ by encrypting CHK_IN with key $K_1$, and the XORing the result with CHK_OUT. This process is described mathematically as follows:

$C_m=E_{K1}(\text{CHK\_IN}) \oplus \text{CHK\_OUT}.$

At step 430, the sender re-sets those values $C_i$ wherein $i \in U$ (that is, those plaintexts to be sent unencrypted), such that $C_i=P_i$. At step 440, the sender transmits $C_0 \ldots C_m$.

The mode is called CBC-IO because authentication tag is computed by combining information with the input and output of the last encryption. The steps of generating an authentication tag using the CBC-IO mode differ from IACBC by the generation of CHK_IN and CHK_OUT values. Due to this difference, the decryption and verification process at a receiver must also be configured differently.

Figure 4B:
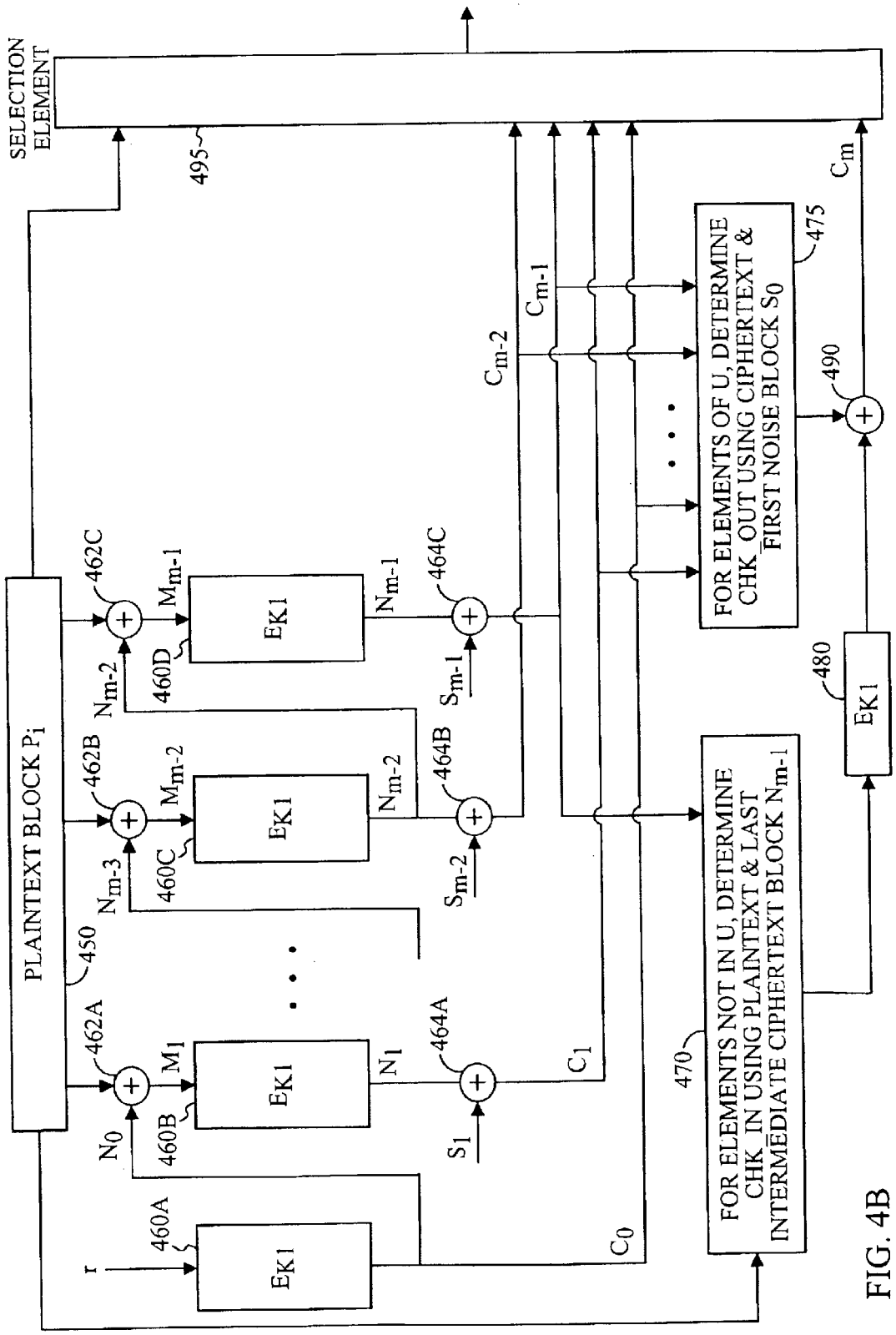
FIG. 4B is a block diagram of an apparatus for performing the CBC-IO Mode.

FIG. 4B is a block diagram of hardware that is configured to perform the above CBC-IO mode. It should be noted that FIG. 4B illustrates an implementation that can be an alternative to a software implementation, wherein a processor and memory is configured to execute a set of instructions for performing the above CBC-IO mode. Memory element 450 stores plaintext blocks $P_i$, some of which are to be encrypted and all of which are to be authenticated. Encryption elements 460A, 460B, 460C, and 460D are configured to perform a cryptographic function upon inputs. For illustrative purposes only, four (4) encryptions elements are shown in FIG. 4B for encrypting plaintext blocks, but one of skill in the art knows that more or less encryption elements can be implemented without affecting the scope of the embodiment.

In this embodiment, the inputs to the encryption elements 460A, 460B, 460C, and 460D are the nonce value r at the first encryption element 460A, and intermediate plaintext blocks $M_1$ through $M_{m-1}$, individually, at each respective remaining encryption element. The intermediate plaintext blocks $M_1$ through $M_{m-1}$ are the output of combining elements 462A, 462B, and 462C. In one aspect, the combining elements 462A, 462B, and 462C are XOR gates. The outputs of the encryption elements 460A, 460B, 460C, and 460D are intermediate ciphertext blocks $N_0$ through $N_{m-1}$. The intermediate ciphertext blocks $N_1$ through $N_{m-1}$ are combined with corresponding noise blocks $S_1$ through $S_{m-1}$ by combining elements 464A, 464B, and 464C. The outputs of the combining elements 464A, 464B, and 464C are ciphertext blocks $C_1$ through $C_{m-1}$.

Processing block (or checksum generator) 470 is configured to determine a checksum value CHK_IN by using plaintext blocks that are to be transmitted in an encrypted form and the last intermediate ciphertext block $N_{m-1}$. Processing block (or checksum generator) 475 is configured to determine a checksum value CHK_OUT by using the first noise block $S_0$ and ciphertext blocks corresponding to plaintext blocks that are to be transmitted in the clear. Formulas for determining CHK_IN and CHK_OUT have been described above. CHK_IN is then input into an encryption element 480. The output of the encryption element 480 is then combined with CHK-OUT using a combiner element 490. The output of the combiner element 490 is the last ciphertext block $C_m$, which is also used as an authentication tag.

The ciphertext blocks $C_1$ through $C_{m-1}$, the authentication tag Cm, and the plaintext blocks $P_i$ are input into a selection element 495, which determines whether the blocks that are to be transmitted are either ciphertext or plaintext. In other words, those $P_i$ where $i \in U$ are transmitted, along with those $C_i$ for which $i \notin U$.

Figure 5:
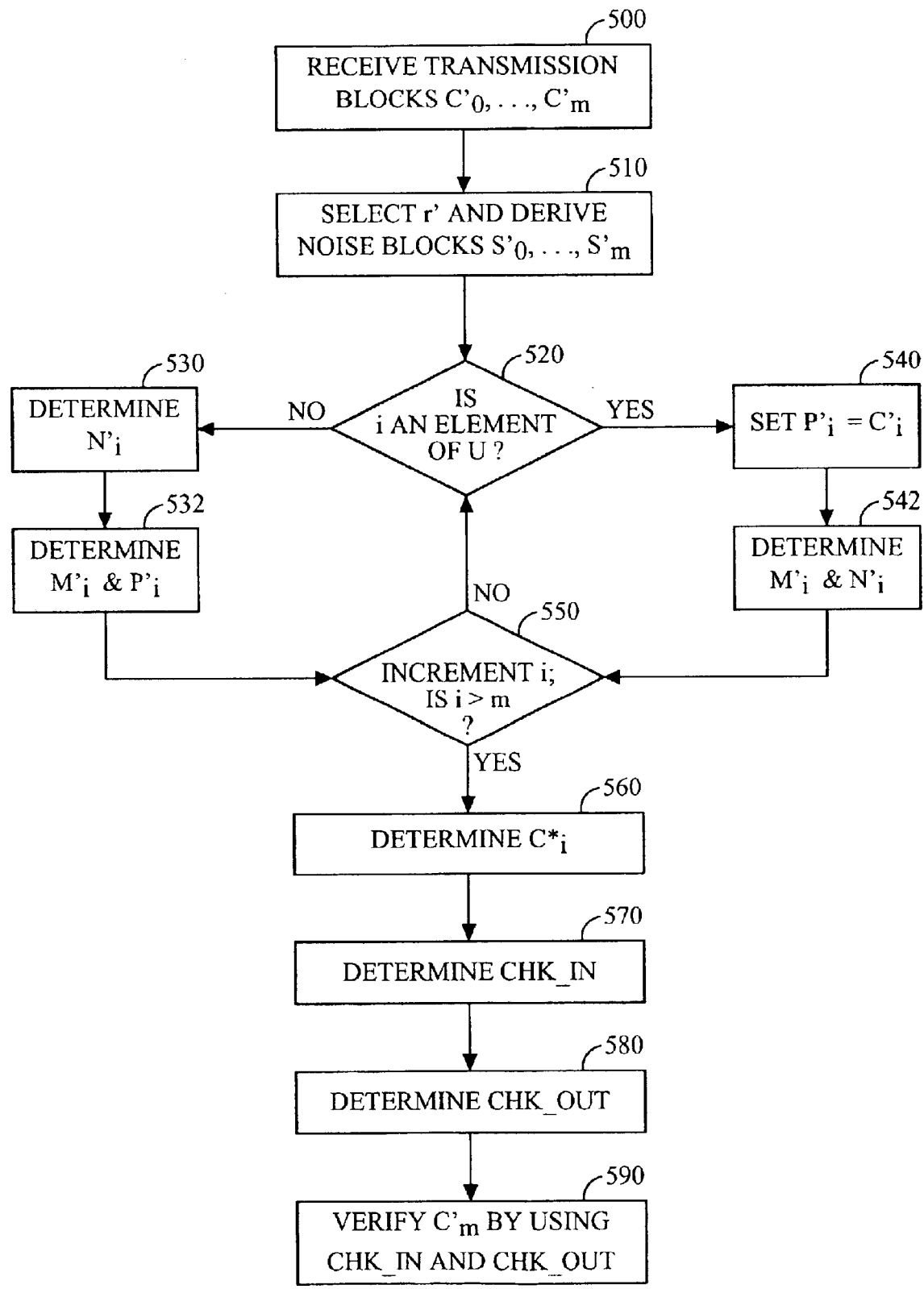
FIG. 5 is a block diagram of the decryption and verification of a message that has been encrypted and authenticated by CBC-IO Mode.

FIG. 5 is a block diagram of the decryption and verification of a message that has been encrypted and authenticated by the CBC-IO mode. At step 500, a receiver receives blocks $C'_0 \ldots C'_m$. Note that for $i \in U$, $C'_i$ was transmitted unencrypted. At step 510, the receiver uses key $K_1$ to decrypt $C'_0$ in order to obtain r'. The value r' and the key $K_0$ are used to derive the values of the noise blocks $S'_0$ through to $S'_m$.

At step 520, an iterative procedure for i, where $1 \leq i \leq m$, begins with a decision as to whether $i \in U$. If $i \notin U$, then the program flow proceeds to step 530. If $i \in U$, then the program flow proceeds to step 540. At step 530, the receiver determines the intermediate ciphertexts $N'_i$ for $i \notin U$. The intermediate ciphertexts $N'_i$ for $i \notin U$ are determined by XORing $C'_i$ with $S'_i$, which is described mathematically as:

$$N'_i = C'_i \oplus S'_i.$$

At step 532, the receiver decrypts the intermediate ciphertexts $N_i$ for $i \notin U$, as $$M'_i = D_{K1}(N'_i),$$

$$P'_i = M'_i \oplus N'_{i-1}.$$

The program flow proceeds to step 550.

For $i \in U$, at step 540, the receiver determines that $P'_i = C'_i$ for $i \in U$.

At step 542, proceeding in sequence through the values $i \in U$, the receiver combines $P'_i$ and $N'_{i-1}$ to obtain $M'_i$ according to relations:

$$M'_i = P'_i \oplus N'_{i-1},$$

$$N'_i = E_{K1}(M'_i).$$

The program flow proceeds to step 550. At step 550, the index i is incremented and a decision is made as to whether i>m. If the condition i>m is not true, then the program flow goes back to step 520. If the condition i>m is true, then the program flow proceeds to step 560, which is the start of the verification process.

It should be noted that the above steps for determining the intermediate ciphertext blocks and the intermediate plaintext blocks for the cleartext positions can be interchangeably ordered without affecting the scope of the embodiments. It should also be noted that the above steps can be easily altered to accommodate a set of ciphertext positions, rather than cleartext positions, i.e., the steps can be described in relation to the blocks that have been specified as being encrypted, rather than in relation to the blocks that have been sent in the clear. It should also be noted that the values that are computed in the above steps are stored for further use in the iterative procedure.

The receiver has now decrypted all the ciphertext, but the receiver now needs to verify the integrity. To verify the integrity, at step 560, the receiver first forms secondary ciphertexts $C^*_i$ for $i \in U$, according to the relation:

$$C^*_i = N'_i \oplus S'_i.$$

At step 570, the receiver computes a checksum value CHK_IN', which is defined by:

$$\text{CHK\_IN'} = (\oplus_{i \notin U} P'_i) \oplus N'_{m-1}.$$

At step 580, the receiver computes a checksum value CHK_OUT', which is defined by the relation:

$$\text{CHK\_OUT'} = (\oplus_{i \in U} C^*_i) \oplus S'_o.$$

At step 590, a value X is computed by encrypting CHK_IN' with key $K_1$, and the XORing the result with CHK_OUT'. This process is described mathematically as follows:

$$X = E_{K1}(\text{CHK\_IN'}) \oplus \text{CHK\_OUT'}.$$

The receiver compares X and $C'_m$ in order to determine if they are equal. If they are equal, then the receiver can be sure of the integrity of the message. If the message integrity is verified, the message is $$P = P_1, \ldots, P_{m-1}.$$

In alternate embodiments, the receiver uses alternate values for the comparison. In one embodiment, the authentication tag is combined with CHK_OUT to form a test encrypted input checksum value. The input checksum value is encrypted and then compared to the test encrypted input checksum value. The authentication tag is verified if the test encrypted input checksum value and the encrypted input checksum value are the same. In another embodiment, the authentication tag is combined with the output checksum value to form a test encrypted input checksum value. The test encrypted input checksum is decrypted to obtain a test input checksum value; and the test input checksum value is then compared with the input checksum value. The authentication tag is verified if the test input checksum value and the input checksum value are the same.

In another alternative embodiment, the verification steps 560 through to 590 can be performed in parallel to the decryption steps of 520 through to 550. This parallel processing increases the speed at which the receiver processes encrypted and authenticated transmissions from the sender.

Figure 6A:
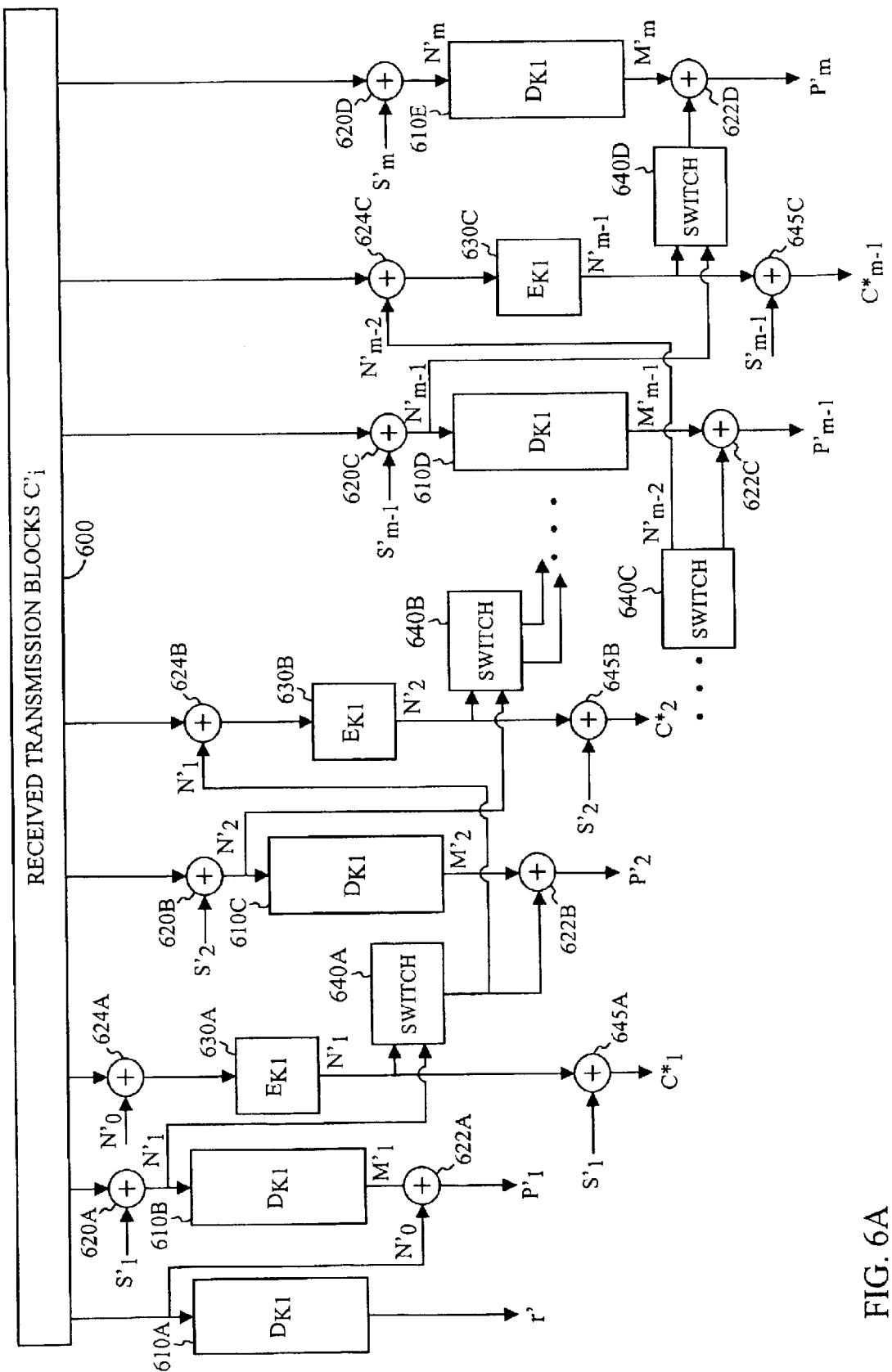
FIG. 6A is a block diagram of an apparatus for performing the decryption and verification of a message that has been encrypted and authenticated by CBC-IO Mode.
Figure 6D:
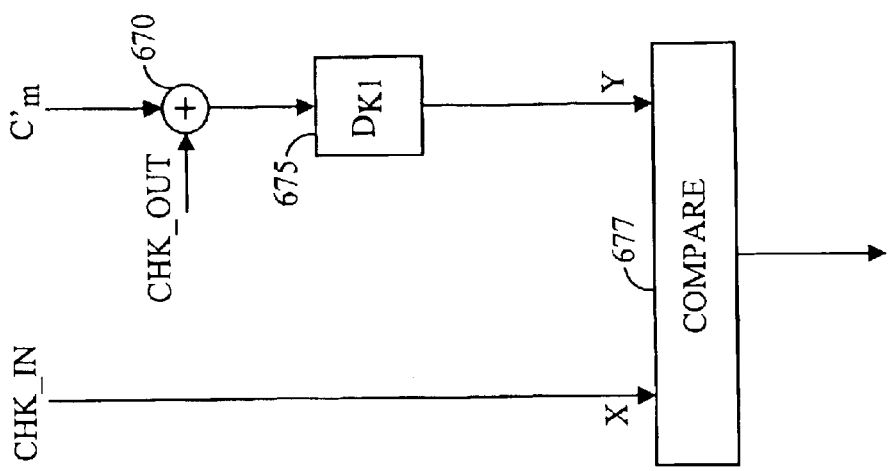
FIGS. 6B, 6C, and 6D are block diagrams of different embodiments for verifying messages encrypted and authenticated by CBC-IO mode.
Figure 6C:
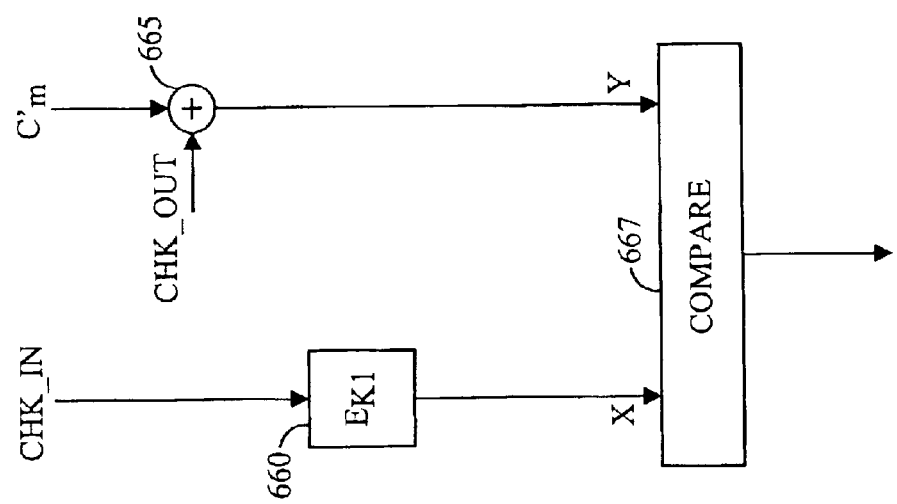
Figure 6B:
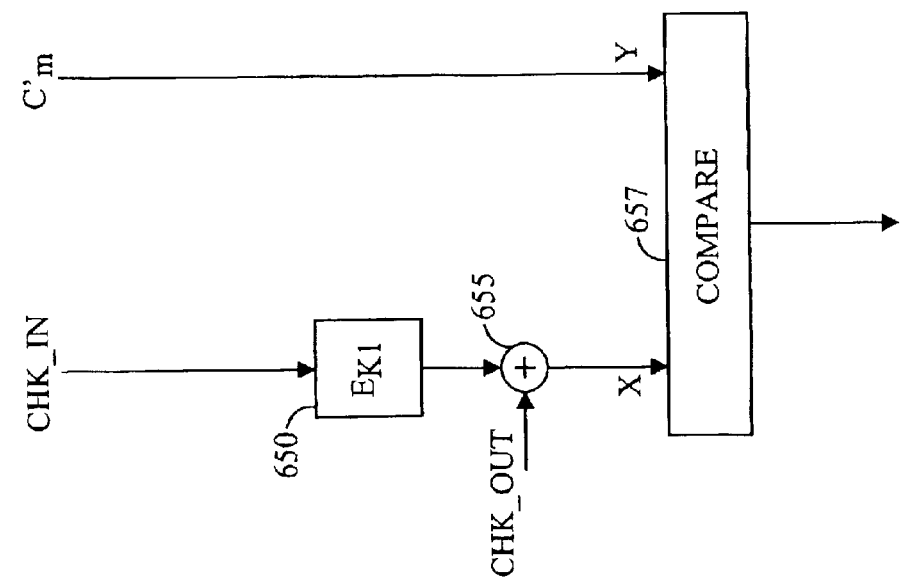

FIG. 6A is a block diagram of hardware that is configured to perform the decryption of messages that have been encrypted using the above CBC-IO mode. FIGS. 6B, 6C and 6D are block diagrams of hardware that is configured to perform the verification of messages that have been authenticated using the above CBC-IO mode. In FIG. 6A, the received blocks $C'_0, C'_1, \ldots$ and $C'_m$ are stored in memory 600. Decryption elements 610A, 610B, 610C, 610D and 610E are configured to perform a decryption function using a key $K_1$, which has been agreed upon between the sender and the recipient during a key negotiation process, the details of which will not be discussed herein. The input to the first decryption element 610A is block $C'_0$, which is the first block of the message from the sender. The output of the first decryption element 610A is r', which will be used to determine noise blocks $S'_0, S'_1, \ldots, S'_{m-1}$, which are determined by using hardware configurations not shown herein.

The input to the other decryption elements 610B, 610C, 610D and 610E produce intermediate ciphertext blocks $N'_0$ through $N'_m$, individually, at each respective decryption element. The intermediate ciphertext blocks $N'_1$ through $N'_m$ are formed by combining a corresponding noise block $S'_i$ with a received ciphertext block $C'_i$ for all $i \notin U$, wherein the combining is performed by using combining elements 620A, 620B, 620C and 620D, such as, e.g., XOR gates or modular integer addition adders.

The output of the decryption elements 610A, 610B, 610C, 610D and 610E are individually combined with an associated intermediate ciphertext block $N'_i$ using combining elements 622A, 622B, 622C and 622D. The output of the combining elements 622A, 622B, 622C and 622D are plaintext blocks $P'_i$, for which $i \notin U$.

For generation of intermediate ciphertext blocks $N'_i$ where $i \in U$, encryption elements 630A, 630B, and 630C use the key $K_1$ to encrypt a previous intermediate ciphertext block $N'_{i-1}$ into intermediate ciphertext block $N'_i$. Combining elements 624A, 624B, and 624C combine previous intermediate ciphertext block $N'_{i-1}$ with plaintext blocks $P'_i$ to form intermediate plaintext blocks $M'_i$ which are encrypted by encryption elements 630A, 630B, 630C and 630D. It should be noted that the plaintext blocks $P'_i$ for which $i \in U$, are simply derived by setting $P'_i = C'_i$ for which $i \in U$, after the determination of $P'_i$ for which $i \notin U$. The generation of intermediate ciphertext blocks $N_i$ where $i \in U$, is included in order to allow the iterative determination of plaintext blocks $P'_i$, for which $i \notin U$, and to generate the secondary ciphertext blocks $C^*_i$, which are used for verification purposes. In this embodiment, switches 640A, 640B, 640C and 640D are implemented with control lines (not shown) that facilitate the selection of an appropriate intermediate ciphertext block according to whether a cleartext position or a ciphertext position preceded the instant position.

The input checksum CHK_IN can be determined as the output of a combination element (not shown) that combines the last intermediate ciphertext block $N'_m$ with the combination of all plaintext blocks $P'_i$ for which $i \notin U$. The output checksum CHK_OUT can be determined as the output of a combination element (not shown) that combines the first noise block $S'_0$ with the combination of all secondary ciphertexts $C^*_i$, each of which is defined as the combination of a corresponding intermediate ciphertext block $N'_i$ and a corresponding noise block $S'_i$. The secondary ciphertext blocks $C^*_i$ are the output of combining elements 645A, 645B, and 645C in FIG. 6A.

FIG. 6B shows one embodiment for verifying the authentication tag. The CHK_IN value is input into an encryption element 650. The output of the encryption element 650 is combined with the CHK_OUT value at a combining element 655. The output of the combining element 655 is then compared at a comparing element 657 to the received block $C'_m$, which is the authentication tag. FIG. 6C is another embodiment for verifying the authentication tag. The CHK_IN value is input into an encryption element 660. The authentication tag $C'_m$ is combined with the CHK_OUT value at a combining element 665. The output of the combining element 665 is compared to the output of the encryption element 660 at comparing element 667 in order to verify the authentication tag. FIG. 6D is another embodiment for verifying the authentication tag. The authentication tag $C'_m$ is combined with the CHK_OUT value at a combining element 670. The output of the combining element 670 is input into a decryption element 675. The output of the decryption element 675 is then compared to the CHK_IN value at a comparing element 677. If any of the comparisons indicate a match, then the authentication tag $C'_m$ is verified.

An attacker may cause the receiver to use the wrong set of cleartext positions when the receiver attempts to decrypt the message. To prevent this type of attack, the sender and receiver must use some other method to verify the cleartext positions that apply to particular ciphertext messages. There are simple solutions to this problem. One solution is to have a standard agreement for which positions are cleartext positions. Another solution is to include, in the data blocks, a representation of the set U of cleartext positions, so that verification of the ciphertext includes verification of the set of cleartext positions.

The inclusion of the values $C_i$, $i \notin U$, in the checksum forms a difference between the CBC-IO mode of operation and the modes of operations proposed by Jutla and Gligor and Donescu. Note that CBC-IO uses block cipher encryption when computing the ciphertext and authentication tag. However, it is equally valid for the block cipher decryption to be used in the place of some or all of the block cipher encryptions operations. This would result in changes from block cipher decryption to block cipher encryption (and vice versa) during decryption and message integrity.

In the CBC-IO mode, the encryption and authentication functions are secure if the underlying block cipher is secure. There are formal expressions in the art for what is meant by the phrase "the encryption and authentication functions are secure," however these formal expressions are not relevant to the subject matter of the instant invention and will not be discussed herein. One skilled in the art will be familiar with the meaning of the phrase "the encryption and authentication functions are secure."

While the embodiments herein have been described with respect to a CBC-IO mode based on the AES block cipher, these embodiments can also be applied to construct CBC-IO mode based on other block ciphers. Note that the sender can choose to send either $P_i$ or $C_i$, and the authentication is not compromised. The embodiments described herein allow a party to transmit both encrypted and unencrypted blocks without compromising the security of the authentication scheme. If $P_i$ is sent as plaintext, then the encrypted version of $P_i$ is still secret and unpredictable and can be used for secure authentication.

It is common practice to define the MAC as only a portion of the final block when using an authentication mode. The present embodiments may also be altered such that only a portion of the final block is transmitted as the MAC.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encrypting and authenticating data as a single entity, comprising:

arranging data into a plurality of plaintext blocks, each sized according to a cipher block size;

specifying at least one cleartext position for which at least one ciphertext block will be the same as a corresponding plaintext block;

determining a plurality of noise blocks using a nonce value and a first key;

determining a plurality of intermediate ciphertext blocks, wherein the first intermediate ciphertext block corresponds to an encrypted nonce value, and the remaining intermediate ciphertexts are computed iteratively by encrypting a plurality of intermediate plaintext blocks with a second key, wherein each intermediate plaintext block is a combination of one of the plurality of plaintext blocks and a preceding intermediate ciphertext block;

determining a plurality of ciphertext blocks by using the plurality of intermediate ciphertext blocks and the plurality of noise blocks, wherein the first ciphertext block is the same as the first intermediate ciphertext block and the remaining ciphertext blocks are derived by combining a corresponding intermediate ciphertext block with a corresponding noise block;

computing an input checksum value based on the plurality of plaintext blocks and the intermediate ciphertext block corresponding to the last plaintext block;

computing an output checksum value based on the plurality of ciphertext blocks and a noise block;

computing an authentication tag by encrypting the input checksum value with the second key and combining the encrypted input checksum value with the output checksum;

substituting each of the plurality of ciphertext blocks that is specified by a cleartext position with a corresponding plaintext block; and appending the authentication tag.

2. The method of claim 1, wherein the encrypting uses block cipher encryption.

3. The method as in any one of the preceding claims, wherein the encrypting comprises:

choosing to apply block cipher encryption or block cipher decryption;

selecting a block cipher to use, according to a set of predetermined selection rules; and forming the plurality of intermediate ciphertext blocks by applying the chosen block cipher encryption or block cipher decryption to one of the plurality of plaintext blocks combined with the preceding intermediate ciphertext block.

4. The method as in claim 1, wherein computing the input checksum value comprises:

combining all of the plurality of plaintext blocks that correspond to a position that is not specified as the at least one cleartext position; and combining the last noise block and the combined plurality of plaintext blocks.

5. The method as in claim 1, wherein computing the output checksum comprises:

combining all of the plurality of ciphertext blocks that correspond to the at least one cleartext position; and combining the first noise block and the combined plurality of ciphertext blocks.

6. The method as in any one of claims 4 or 5, wherein combining is performed using a bit-wise exclusive-or operation.

7. The method as in any one of claims 4 or 5, wherein combining is performed using a group operator.

8. The method of claim 7, wherein the group operator is a modular integer addition operator.

9. A method for decrypting and verifying a plurality of data blocks accompanied by an authentication tag, wherein a set of cleartext positions is defined, comprising:

using a nonce value and a first key to determine a plurality of noise blocks;

combining each of the plurality of data blocks that is not specified by a cleartext position in the set of cleartext positions with a corresponding noise block in order to determine a plurality of intermediate ciphertext blocks;

designating each of the plurality of data blocks that is specified by a cleartext position in the set of cleartext positions as a plaintext block in a plurality of plaintext blocks;

for each cleartext position in the set of cleartext positions, combining the corresponding plaintext block with a previous intermediate ciphertext block to form an intermediate plaintext block and encrypting the intermediate plaintext block to form an intermediate ciphertext block corresponding to the cleartext position;

for each position not in the set of cleartext positions, decrypting the corresponding intermediate ciphertext block to form an associated intermediate plaintext block and combining the associated intermediate plaintext block with a previous intermediate ciphertext block to form a plaintext block for each position not in the set of cleartext positions;

determining a plurality of secondary ciphertext blocks, wherein each of the plurality of secondary ciphertext blocks correspond to a cleartext position in the set of cleartext positions and are formed by combining a corresponding intermediate ciphertext block with a corresponding noise block;

computing an input checksum value by combining the last intermediate ciphertext block and the plurality of data blocks that is not specified by a cleartext position in the set of cleartext positions;

computing an output checksum value by combining a noise block and the plurality of secondary ciphertext blocks; and verifying the authentication tag.

10. The method of claim 9, wherein verifying the authentication tag comprises:

computing a test authentication tag by encrypting the input checksum value with a second key and combining the encrypted input checksum value with the output checksum value; and comparing the test authentication tag with the authentication tag, wherein the authentication tag is verified if the test authentication tag and authentication tag are the same.

11. The method of claim 9, wherein verifying the authentication tag comprises:

combining the authentication tag with the output checksum value to form a test encrypted input checksum value;

encrypting the input checksum value; and comparing the test encrypted input checksum value with the encrypted input checksum value, wherein the authentication tag is verified if the test encrypted input checksum value and the encrypted input checksum value are the same.

12. The method of claim 9, wherein verifying the authentication tag comprises:

combining the authentication tag with the output checksum value to form a test encrypted input checksum value;

decrypting the test encrypted input checksum to obtain a test input checksum value; and comparing the test input checksum value with the input checksum value, wherein the authentication tag is verified if the test input checksum value and the input checksum value are the same.

13. Apparatus for encrypting and authenticating data, comprising:

at least one memory element; and at least one processing element configured to execute a set of instruction stored in the memory element, the set of instructions for:

arranging data into a plurality of plaintext blocks, each sized according to a cipher block size;

specifying at least one cleartext position for which at least one ciphertext block will be the same as a corresponding plaintext block;

determining a plurality of noise blocks using a nonce value and a first key;

determining a plurality of intermediate ciphertext blocks, wherein the first intermediate ciphertext block corresponds to an encrypted nonce value, and the remaining intermediate ciphertexts are computed iteratively by encrypting a plurality of intermediate plaintext blocks with a second key, wherein each intermediate plaintext block is a combination of one of the plurality of plaintext blocks and a preceding intermediate ciphertext block;

determining a plurality of ciphertext blocks by using the plurality of intermediate ciphertext blocks and the plurality of noise blocks, wherein the first ciphertext block is the same as the first intermediate ciphertext block and the remaining ciphertext blocks are derived by combining a corresponding intermediate ciphertext block with a corresponding noise block;

computing an input checksum value based on the plurality of plaintext blocks and the intermediate ciphertext block corresponding to the last plaintext block;

computing an output checksum value based on the plurality of ciphertext blocks and a noise block;

computing an authentication tag by encrypting the input checksum value with the second key and combining the encrypted input checksum value with the output checksum;

substituting each of the plurality of ciphertext blocks that is specified by a cleartext position with a corresponding plaintext block; and appending the authentication tag.

14. Apparatus for encrypting and authenticating data, comprising:

at least one memory element; and at least one processing element configured to execute a set of instruction stored in the memory element, the set of instructions for:

using a nonce value and a first key to determine a plurality of noise blocks;

combining each of the plurality of data blocks that is not specified by a clear text position in the set of cleartext positions with a corresponding noise block in order to determine a plurality of intermediate ciphertext blocks;

designating each of the plurality of data blocks that is specified by a cleartext position in the set of cleartext positions as a plaintext block in a plurality of plaintext blocks;

for each cleartext position in the set of cleartext positions, combining the corresponding plaintext block with a previous intermediate ciphertext block to form an intermediate plaintext block and encrypting the intermediate plaintext block to form an intermediate ciphertext block corresponding to the cleartext position;

for each position not in the set of cleartext positions, decrypting the corresponding intermediate ciphertext block to form an associated intermediate plaintext block and combining the associated intermediate plaintext block with a previous intermediate ciphertext block to form a plaintext block for each position not in the set of cleartext positions;

determining a plurality of secondary ciphertext blocks, wherein each of the plurality of secondary ciphertext blocks correspond to a cleartext position in the set of cleartext positions and are formed by combining a corresponding intermediate ciphertext block with a corresponding noise block;

computing an input checksum value by combining the last intermediate ciphertext block and the plurality of data blocks that is not specified by a cleartext position in the set of cleartext positions;

computing an output checksum value by combining a noise block and the plurality of secondary ciphertext blocks; and verifying authentication tag.

15. A method for encrypting and authenticating data as a single entity, comprising:

specifying a set of cleartext positions and a set of ciphertext positions, wherein the set of cleartext positions are for indicating that a block in a cleartext position is not encrypted and the set of ciphertext positions are for indicating the a block in the ciphertext position is encrypted;

if a data block is in a cleartext position, then:

setting a plaintext block equal to the data block;

XORing the plaintext block with a previous intermediate ciphertext block to form an intermediate plaintext block;

encrypting the intermediate plaintext block to form an intermediate ciphertext block;

if the data block is in a ciphertext position, then:

XORing the data block with a sequence corresponding to the data block from a set of sequences to form a corresponding intermediate ciphertext block;

decrypting the corresponding intermediate ciphertext block to form an intermediate plaintext block; and XORing the intermediate plaintext block with a previous intermediate ciphertext block to form a plaintext block;

computing an authentication tag using all intermediate blocks;

computing a last ciphertext block using the authentication tag, the first sequence from the set of sequences and the last sequence from the set of sequences; and transmitting the ciphertext blocks and the authentication tag.

16. A method for secure data transmissions, wherein a first portion of the data transmission is sent as plaintext, a second portion of the data transmission is sent as ciphertext, and all of the data transmission is authenticated, the method comprising:

generating a set of cleartext positions;

encrypting the first portion of the data transmission and the second portion of the data transmission into ciphertext, wherein the first portion of the data transmission is specified by the set of cleartext positions and the second portion of the data transmission is not associated with any one of the set of cleartext positions;

generating an input checksum value using the data transmission that is not associated with any one of the set of cleartext positions;

generating an output checksum value using the ciphertext of the first portion of the data transmission;

generating an authentication tag using the input checksum value and the output checksum value; and transmitting the plaintext, the ciphertext, and the authentication tag, wherein the plaintext is the first portion of the data transmission specified by the set of cleartext positions.

17. A method for decrypting and verifying a plurality of received transmission blocks, comprising:

determining whether each of the plurality of received transmission blocks is specified by a cleartext position from a set of cleartext positions;

decrypting the plurality of received transmission blocks, the decrypting comprising:

if not specified by a cleartext position, then generating a set of intermediate ciphertext blocks, decrypting the set of intermediate ciphertext blocks to generate a set of intermediate plaintext blocks, and generating a set of plaintext blocks;

if specified by a cleartext position, then combining each of the plurality of received transmission blocks specified by a cleartext position with a previous intermediate ciphertext block to form an intermediate plaintext block, and encrypting the intermediate plaintext block to obtain an intermediate ciphertext block; and verifying the plurality of received transmission blocks, the verifying comprising: forming an input checksum value using the set of plaintext blocks not specified by a cleartext position;

forming an output checksum value using a set of secondary ciphertext blocks, wherein the secondary ciphertext blocks are derived from a set of intermediate ciphertext blocks not associated with a cleartext position; and using the input checksum value and the output checksum value for comparison to authentication tag.

18. The method of claim 17, wherein the decrypting is performed in parallel to the verifying.

19. Apparatus for encrypting and authenticating data, comprising:

at least one memory element for storing a set of plaintext blocks;

at least one combining element for combining input blocks;

at least one encrypting element for performing a cryptographic function upon inputs;

at least one selection element for selecting either a plaintext block or a ciphertext block for transmission in a specific position in a transmission stream;

at least two checksum generators; and at least one processing element, wherein the at least one processing is for controlling the at least one memory element, the at least one combining element, the at least one encrypting element, the at least two checksum generators, and the at least one selection element, such that:

a first portion of the at least one combining element is for combining a plaintext block with a previous stage intermediate ciphertext block to output an intermediate plaintext block, a first portion of the at least one encrypting element is for generating a current stage intermediate ciphertext block from the intermediate plaintext block, a second portion of the at least one combining element is for outputting a ciphertext block from combining the current state intermediate ciphertext block with a noise block, the first checksum generator is for outputting a first checksum from a set of specified plaintext blocks, a second portion of the at least one encrypting element is for encrypting the first checksum, the second checksum generator is for outputting a second checksum from a set of specified ciphertext blocks, and a third portion of the at least one combining element is for combining the encrypted first checksum and the second checksum to form an authentication tag.

20. Apparatus for decrypting and verifying data transmissions, comprising:

at least one memory element for storing a set of data transmission blocks;

at least one combining element for combining input blocks;

at least one encryption element for performing a first cryptographic function upon inputs;

at least one decryption element for performing a second cryptographic function upon inputs, wherein the second cryptographic function is the reverse of the first cryptographic function;

at least one switching element for selecting either an output from the at least one encryption element or an output from the at least one combining element;

at least two checksum generators for generating an input checksum based on a specified set of plaintext blocks and an output checksum based on a set of secondary ciphertext blocks; and at least one processing element, wherein the at least one processing is for controlling the at least one memory element, the at least one combining element, the at least one encryption element, the at least one decryption element, the at least two checksum generators, and the at least one switching element such that:

a first portion of the at least one combining element is for combining a data transmission block with noise block to form an intermediate ciphertext block, the at least one decryption element is for decrypting the intermediate ciphertext block to form an intermediate plaintext block, a second portion of the at least one combining element is for combining the intermediate plaintext block with a previous stage intermediate ciphertext block to form a plaintext block, a third portion of the at least one combining element is for combining the data transmission block with the previous stage intermediate ciphertext block, to from a second intermediate plaintext block, the at least one encryption element is for encrypting the second intermediate plaintext block to form a second intermediate ciphertext block, the at least one switching element for selecting either the first intermediate ciphertext block or the second intermediate ciphertext block, and a second portion of the at least one combining element is for combining the noise block with the second intermediate ciphertext block to form a secondary ciphertext block.

21. Apparatus for secure data transmissions, wherein a first portion of the data transmission is sent as plaintext, a second portion of the data transmission is sent as ciphertext, and all of the data transmission is authenticated, the method comprising:

means for generating a set of cleartext positions;

means for encrypting the first portion of the data transmission and the second portion of the data transmission into ciphertext, wherein the first portion of the data transmission is specified by the set of cleartext positions and the second portion of the data transmission is not associated with any one of the set of cleartext positions;

means for generating an input checksum value using the data transmission that is not associated with any one of the set of cleartext positions;

means for generating an output checksum value using the ciphertext of the first portion of the data transmission;

means for generating an authentication tag using the input checksum value and the output checksum value; and means for transmitting the plaintext, the ciphertext, and the authentication tag, wherein the plaintext is the first portion of the data transmission specified by the set of cleartext positions.

22. Apparatus for decrypting and verifying a plurality of received transmission blocks, comprising:

means for determining whether each of the plurality of received transmission blocks is specified by a cleartext position from a set of cleartext positions;

means for decrypting the plurality of received transmission blocks, the decrypting comprising:

if not specified by a cleartext position, then generating a set of intermediate ciphertext blocks, decrypting the set of intermediate ciphertext blocks to generate a set of intermediate plaintext blocks, and generating a set of plaintext blocks;

if specified by a cleartext position, then combining each of the plurality of received transmission blocks specified by a cleartext position with a previous intermediate ciphertext block to form an intermediate plaintext block, and encrypting the intermediate plaintext block to obtain an intermediate ciphertext block; and means for verifying the plurality of received transmission blocks by forming an input checksum value using the set of plaintext blocks not specified by a cleartext position, forming an output checksum value using a set of secondary ciphertext blocks, wherein the secondary ciphertext blocks are derived from a set of intermediate ciphertext blocks not associated with a cleartext position, and using the input checksum value and the output checksum value for comparison to authentication tag.

* * * * *